(12) United States Patent
Park et al.

(10) Patent No.: US 12,308,492 B2
(45) Date of Patent: May 20, 2025

(54) INTEGRATED COOLING CONTROL VALVE

(71) Applicants: Hyundai Motor Company, Seoul (KR); Kia Corporation, Seoul (KR)

(72) Inventors: Hun Woo Park, Namyangju-si (KR); Jin Hun Lee, Yongin-si (KR); Hyun Ju Ji, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 995 days.

(21) Appl. No.: 17/363,450

(22) Filed: Jun. 30, 2021

(65) Prior Publication Data

US 2022/0173415 A1 Jun. 2, 2022

(30) Foreign Application Priority Data

Nov. 30, 2020 (KR) .................. 10-2020-0163558

(51) Int. Cl.
| | |
|---|---|
| *H01M 8/0432* | (2016.01) |
| *F16K 5/06* | (2006.01) |
| *F16K 11/087* | (2006.01) |
| *H01M 8/04701* | (2016.01) |

(52) U.S. Cl.
CPC ......... *H01M 8/0432* (2013.01); *F16K 5/0605* (2013.01); *F16K 5/0647* (2013.01); *F16K 11/0873* (2013.01); *H01M 8/04701* (2013.01); *H01M 2250/20* (2013.01)

(58) Field of Classification Search
CPC ........... H01M 8/0432; H01M 8/04701; H01M 2250/20; F16K 5/0605; F16K 5/0647; F16K 11/0873
See application file for complete search history.

(56) References Cited

U.S. PATENT DOCUMENTS

| | | | |
|---|---|---|---|
| 2005/0252556 A1* | 11/2005 | Williams .............. | F16K 5/0668 137/596.17 |
| 2015/0183337 A1* | 7/2015 | Na ......................... | B60L 50/72 429/437 |
| 2015/0184759 A1* | 7/2015 | Park ..................... | F16K 41/003 251/214 |
| 2016/0164117 A1* | 6/2016 | Na ...................... | H01M 8/0435 429/429 |

FOREIGN PATENT DOCUMENTS

| | | | | |
|---|---|---|---|---|
| KR | 20090008896 A | * | 1/2009 | |
| WO | WO-2019183725 A1 | * | 10/2019 | ............. B60K 11/02 |

* cited by examiner

*Primary Examiner* — Alexander Usyatinsky
(74) *Attorney, Agent, or Firm* — Slater Matsil, LLP

(57) ABSTRACT

An embodiment integrated cooling control valve applied to a fuel cell thermal management system (TMS) includes a ball valve having at least three layers, wherein the ball valve includes a valve housing including a first port fluidly connected to a fuel cell stack, a second port coupled to a cathode oxygen depletion (COD) heater, a third port coupled to an ion filter, a fourth port coupled to a radiator, and a fifth port coupled to a coolant supply pump, and a valve plate disposed within the valve housing and including at least three layers to open and close the first port, the second port, the third port, the fourth port, and the fifth port.

20 Claims, 12 Drawing Sheets

| LAYER | LONG DOWNHILL SECTION |
|---|---|
| THIRD LEVEL |  |
| SECOND LEVEL |  |
| FIRST LEVEL |  |

| LAYER | TEMPERATURE CONTROL |
|---|---|
| THIRD LEVEL |  |
| SECOND LEVEL |  |
| FIRST LEVEL |  |

| LAYER | HIGH OUTPUT |
|---|---|
| THIRD LEVEL |  |
| SECOND LEVEL |  |
| FIRST LEVEL |  | ated cooling control valve.

CROSS-REFERENCE TO RELATED APPLICATIONS

This application claims the benefit of Korean Application No. 10-2020-0163558, filed on Nov. 30, 2020, which application is hereby incorporated herein by reference.

TECHNICAL FIELD

The present disclosure relates to an integrated cooling control valve.

BACKGROUND

In general, a fuel cell system applied to a hydrogen fuel cell vehicle is configured to include a fuel cell stack for generating electric energy using an electrochemical reaction of a reaction gas, a hydrogen supply device for supplying hydrogen, that is, fuel, to the fuel cell stack, an air supply device for supplying the fuel cell stack with air including oxygen, that is, an oxidant necessary for an electrochemical reaction, and a thermal management system (TMS) for optimally controlling an operating temperature of the fuel cell stack by discharging heat, that is, by-products of an electrochemical reaction of the fuel cell stack, to the outside and performing a water management function.

A fuel cell TMS is provided as modularized into such components as a pump, a cathode oxygen depletion (COD) heater, an ion filter, valves, a controller, etc. Accordingly, varied loops such as a cooling loop, a heating loop, a filter loop, etc., each of which circulates a coolant in a different way depending on a state of a fuel cell vehicle, can be implemented.

FIG. 1 is a schematic diagram illustrating a conventional fuel cell TMS. In FIG. 1, reference numeral 1 denotes a fuel cell stack.

A 4-way valve 15 capable of four-direction control and a 3-way valve 60 capable of three-direction control are coupled to the coolant exit line 11 and coolant inlet line 12 of the fuel cell stack 1, respectively. Through control of the 4-way valve 15 and the 3-way valve 60, the fuel cell TMS can be implemented to have a cooling loop, a heating loop, and an ion filter loop.

The cooling loop is a coolant circulation loop for discharging, to the outside, heat generated from the fuel cell stack. The coolant circulation loop is implemented to include a process of cooling a coolant, discharged through the coolant exit line 11 of the fuel cell stack 1, via a radiator 3 through a first valve control port 21 of the 4-way valve 15 by the driving of a pump 4, a process of passing through, by the coolant, the pump 4 via a second valve control port 22 and a third valve control port 23 of the 4-way valve 15, and a process of supplying the coolant to the fuel cell stack 1 via a first valve control port 61 and a second valve control port 62 of the 3-way valve 60.

Furthermore, the heating loop is a coolant circulation loop for improving cold startability of a fuel cell vehicle. The heating loop is implemented to include a process of heating the coolant passing through a third valve control port 63 of the 3-way valve 60 by raising a temperature of the coolant through the COD heater 5, a process of passing through, by the heated coolant, a pump 4 via the third valve control port 23 of the 4-way valve 15 by the driving of the pump 4, and a process of supplying the coolant to the fuel cell stack 1 via the first valve control port 61 and the second valve control port 62 of the 3-way valve 60.

Furthermore, the filter loop is a loop for securing electrical stability by removing metal ions from the coolant after circulating the fuel cell stack 1. The filter loop is implemented to include a process of removing metal ions from the coolant toward the fuel cell stack by circulating the coolant toward the ion filter 7, a process of passing through, by the coolant from which the metal ions have been removed, a fourth valve control port 24 of the 4-way valve 15, and a process of supplying the coolant to the fuel cell stack 1 through the first valve control port 61 and the second valve control port 62 of the 3-way valve 60.

As described above, the conventional fuel cell TMS is provided as modularized into the pump 4, the COD heater 5, the ion filter 7, valves including the 4-way valve 15 and the 3-way valve 60, a controller, etc., thereby implementing such varied loops as the cooling loop, the heating loop, the filter loop, etc. As described above, two valves including the 4-way valve 15 and the 3-way valve 60 are applied to the conventional fuel cell TMS because warm-up for the heating loop and a flux proportion control operation for controlling a flux of the coolant cannot be implemented by one valve body.

However, the conventional fuel cell TMS has a disadvantage in that the volume of a housing for the modularized fuel cell TMS is increased due to a separate mounting space for each valve because two valves including the 4-way valve 15 and the 3-way valve 60 are separately mounted within the modulated fuel cell TMS, and thus has a problem in that it acts as an obstacle factor to achieve weight-lightening and compactness of a heat and water management system, that is, a modularity part of a fuel cell vehicle.

Furthermore, there is a problem in that valve control logic for flow control becomes complicated because the first to fourth valve control ports 21 to 24 included in the existing 4-way valve 15 and the first to third valve control ports 61 to 63 included in the existing 3-way valve 60 are controlled to be individually opened and shut.

The above information disclosed in this Background section is only for enhancement of understanding of the background of the disclosure and accordingly it may contain information that does not form the prior art that is already known to a person of ordinary skill in the art.

SUMMARY

The present disclosure relates to an integrated cooling control valve applied to a fuel cell thermal management system (TMS). Particular embodiments relate to an integrated cooling control valve capable of controlling five ports using one actuator in order to control a flux and direction of a coolant.

Embodiments of the present disclosure take into consideration the above points, and an embodiment of the present disclosure provides one integrated cooling control valve as a valve for controlling various operation sections of a fuel cell TMS.

Another embodiment of the present disclosure provides an integrated cooling control valve for controlling a coolant to be introduced/discharged through five ports using one actuator.

Embodiments of the present disclosure provide an integrated cooling control valve. Embodiments of the present disclosure relate to the integrated cooling control valve applied to a fuel cell thermal management system (TMS). The integrated cooling control valve includes one ball valve having at least three layers. The ball valve includes a valve housing including a first port fluidly connected to a fuel cell stack, a second port coupled to a cathode oxygen depletion (COD) heater, a third port coupled to an ion filter, a fourth port coupled to a radiator, and a fifth port coupled to a coolant supply pump, and a valve plate disposed within the valve housing and including at least three layers in order to open and close the first port, the second port, the third port, the fourth port, and the fifth port.

According to an example, the integrated cooling control valve further includes an actuator configured to provide a driving power for rotating the valve plate and a rotating shaft configured to provide the valve plate with the driving power generated by the actuator. The valve plate as a whole is rotated by the actuator.

According to an example, a first hole, a second hole, a third hole, a fourth hole, and a fifth hole through which a coolant flows communicated with the first port, the second port, the third port, the fourth port, and the fifth port are defined in the valve plate.

According to an example, the third hole provided at one end of the ball valve corresponding to the third port includes a central part and a slit part provided on both sides of the central part. The slit part has a smaller opened area than the central part.

According to an example, the fourth port and the fifth port are coupled to the same layer of the ball valve.

According to an example, the first port is coupled to any one of the second port or the third port and to the same layer of the ball valve.

According to an example, the other port not coupled to the first port among the second port or the third port is solely coupled to any one layer of the ball valve.

According to an example, the integrated cooling control valve further includes a controller configured to control an actuator for driving the ball valve. The controller controls the opening and closing of the ball valve in a long downhill section, a cold start section, a temperature control section, and a high output section.

According to an example, in the long downhill section, the controller controls the valve plate to close the first port and the third port so that a coolant introduced from the radiator and the COD heater is supplied to the coolant supply pump.

According to an example, in the cold start section, the controller controls the valve plate to close the first port, the third port, and the fourth port so that a coolant introduced from the COD heater is supplied to the coolant supply pump.

According to an example, in the temperature control section, the controller controls the valve plate to close the second port so that a coolant introduced from the fuel cell stack and the radiator is supplied to the coolant supply pump.

According to an example, in the high output section, the controller controls the valve plate to close the first port, the second port, and the third port so that a coolant introduced from the radiator is supplied to the coolant supply pump. A total amount of a coolant discharged from the fuel cell stack flows into the radiator and is cooled.

According to an example, the ball valve includes a first layer, a second layer, and a third layer. The first layer of the ball valve is a layer farthest from a location where an actuator for driving the ball valve is disposed. The third layer of the ball valve is a layer closest to the actuator.

According to an example, the first layer is provided with the fourth port and the fifth port. The second layer is provided with the third port. The third layer is provided with the first port and the second port.

According to an example, the first layer is provided with the fourth port and the fifth port. The second layer is provided with the second port. The third layer is provided with the first port and the third port.

According to an example, the first layer is provided with the fourth port and the fifth port. The second layer is provided with the first port. The third layer is provided with the second port and the third port.

According to an example, the first layer is provided with the fourth port and the fifth port. The second layer is provided with the first port and the third port. The third layer is provided with the second port.

According to an example, the first layer is provided with the first port and the third port. The second layer is provided with the fourth port and the fifth port. The third layer is provided with the second port.

According to an example, the first layer is provided with the first port and the third port. The second layer is provided with the second port. The third layer is provided with the fourth port and the fifth port.

According to an example, the first port is a port through which a coolant is introduced from the fuel cell stack. The second port is a port through which the coolant is introduced from the COD heater. The third port is a port through which the coolant is introduced from the ion filter. The fourth port is a port through which the coolant is introduced from the radiator. The fifth port is a port through which the coolant is supplied toward the coolant supply pump.

BRIEF DESCRIPTION OF THE DRAWINGS

The above and other features of embodiments of the present disclosure will now be described in detail with reference to certain exemplary examples thereof illustrated in the accompanying drawings which are given herein below by way of illustration only, and thus are not limitative of the present disclosure, and wherein.

Figure 1:
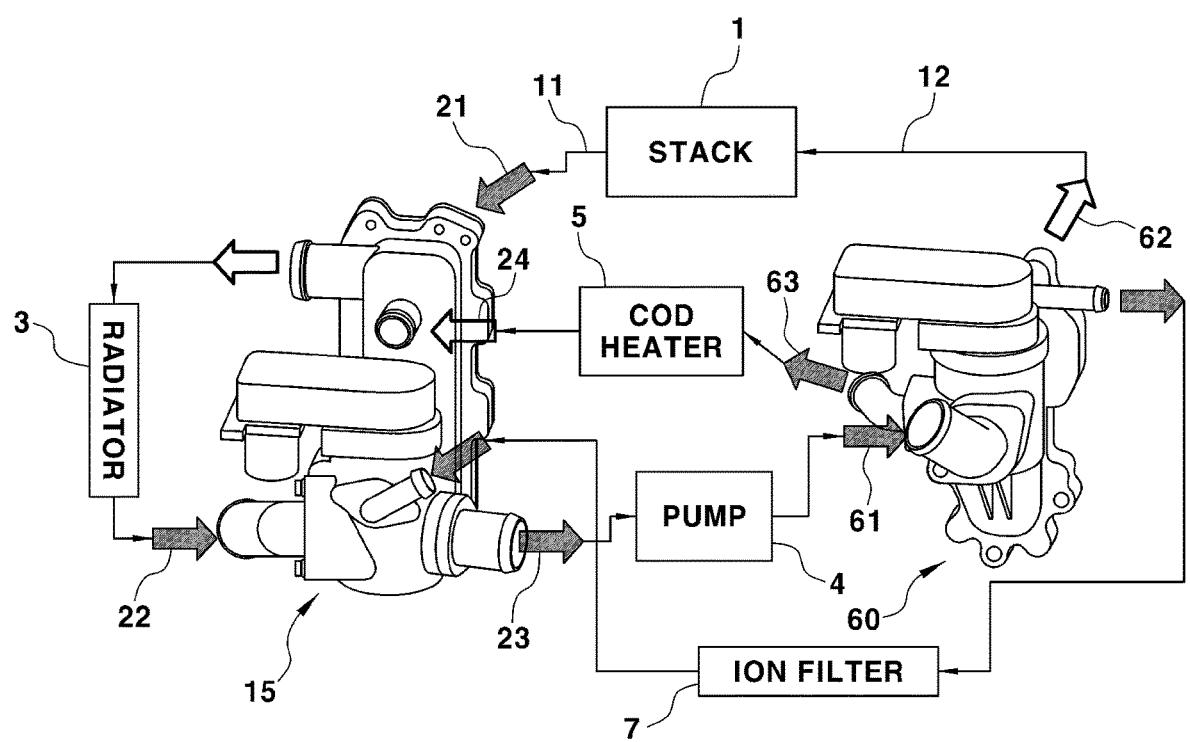
FIG. 1 is a diagram illustrating a conventional fuel cell TMS.

It should be understood that the appended drawings are not necessarily to scale, presenting a somewhat simplified representation of various preferred features illustrative of the basic principles of embodiments of the disclosure. The specific design features of embodiments of the present disclosure as disclosed herein, including, for example, specific dimensions, orientations, locations, and shapes will be determined in part by the particular intended application and use environment.

In the figures, reference numbers refer to the same or equivalent sections of embodiments of the present disclosure throughout the several figures of the drawing.

DETAILED DESCRIPTION OF ILLUSTRATIVE EMBODIMENTS

Hereinafter, preferred exemplary embodiments of the present disclosure will be described with reference to the accompanying drawings. The items expressed in the accompanying drawings may be different from forms actually implemented as schematic drawings for easily describing exemplary embodiments of the present disclosure.

Advantages and characteristics of embodiments of the present disclosure and a method of achieving advantages and characteristics will become more apparent from the embodiments described in detail in conjunction with the accompanying drawings. However, the present disclosure is not limited to the disclosed embodiments, but may be implemented in various different ways. The embodiments are provided to only complete the present disclosure and to allow those skilled in the art to fully understand the category of the present disclosure. The present disclosure is defined by the category of the claims. The same reference numerals will be used to refer to the same or similar elements throughout the specification.

Furthermore, in this specification, the names of elements are divided into a first, a second, etc. in order to distinguish between the elements having the same relation. In the following description, the names of elements are not essentially limited to a corresponding sequence.

The above detailed description illustrates aspects of the present disclosure. Furthermore, the aforementioned description illustrates preferred embodiments of the present disclosure, and the present disclosure may be used in various other combinations, changes and environments. That is, the present disclosure may be changed or modified within the range of a concept of the invention disclosed in this specification, the scope of the disclosure contents and equivalent scopes thereof and/or the range of technology or knowledge in the art. The aforementioned embodiments describe the best state for implementing the technical spirit of the present disclosure, and may include various changes required for a detailed application field and use of the present disclosure. Accordingly, the detailed description of the present disclosure is not intended to restrict the present disclosure to the disclosed implementation state. Furthermore, the appended claims should be interpreted as including other implementation states.

Figure 2:
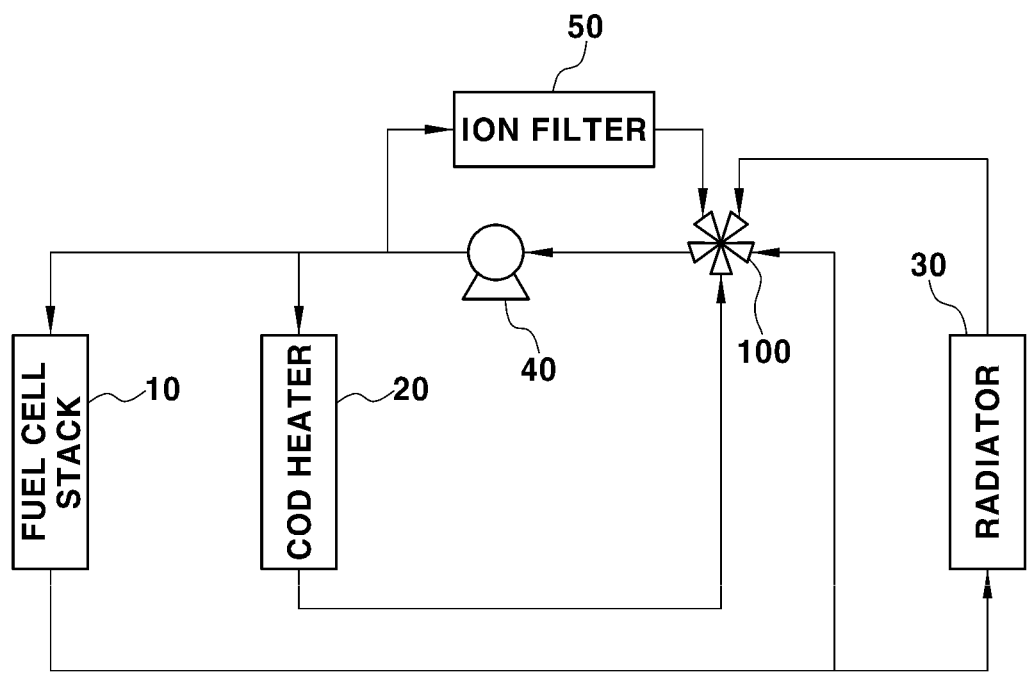
FIG. 2 is a diagram illustrating a fuel cell TMS according to an embodiment of the present disclosure.

FIG. 2 is a diagram illustrating a fuel cell thermal management system (TMS) according to an embodiment of the present disclosure.

Referring to FIG. 2, the fuel cell TMS may include a fuel cell stack 10, a cathode oxygen depletion (COD) heater 20, a radiator 30, a coolant supply pump 40, an ion filter 50, and an integrated cooling control valve 100. The fuel cell TMS is for removing heat of a reaction of the fuel cell stack 10 to the outside of the fuel cell TMS using a coolant, controlling an operating temperature of the fuel cell stack 10, and performing a water management function.

The fuel cell stack 10 may generate electric power through a chemical reaction by using oxygen and hydrogen supplied thereto. A coolant may be introduced into the fuel cell stack 10 in order to discharge heat, that is, by-products generated by a chemical reaction of the fuel cell stack 10.

The COD heater 20 may consume power generated by the fuel cell stack 10 in order to raise a temperature of the coolant when it is necessary to raise the temperature of the coolant or to drop a voltage of the fuel cell stack 10. In particular, upon start-on or start-off of the fuel cell TMS and if regenerative braking continues to be performed when the SOC of a high-voltage battery is sufficient, the COD heater 20 may operate to consume power generated by the fuel cell stack 10.

The radiator 30 may cool the heated coolant again after a chemical reaction of the fuel cell stack 10. The cooled coolant may flow into the integrated cooling control valve 100.

The coolant supply pump 40 may supply the fuel cell stack 10 or the COD heater 20 with the coolant supplied by the integrated cooling control valve 100.

The ion filter 50 may remove ions included in the coolant. The ion filter 50 may remove ions included in the coolant supplied by the coolant supply pump 40. The coolant from which ions have been removed may be delivered to the integrated cooling control valve 100.

The integrated cooling control valve 100 may control the opening and closing of a valve based on a control mode of the fuel cell TMS. The integrated cooling control valve 100 may be a 5-way valve. The coolant may be introduced from the fuel cell stack 10, the COD heater 20, the radiator 30, and the ion filter 50 to the integrated cooling control valve 100. The coolant may flow from the integrated cooling control valve 100 to the coolant supply pump 40. A flux and direction of the coolant may be controlled by the opening and closing of the integrated cooling control valve 100.

According to an embodiment of the present disclosure, in implementing the fuel cell TMS, the integrated cooling control valve 100 in which valves for controlling a flux and direction of a coolant are integrated into one valve may be provided. Expenses consumed to constitute valves can be reduced because the fuel cell TMS can be controlled through the one integrated cooling control valve 100.

Figure 3:
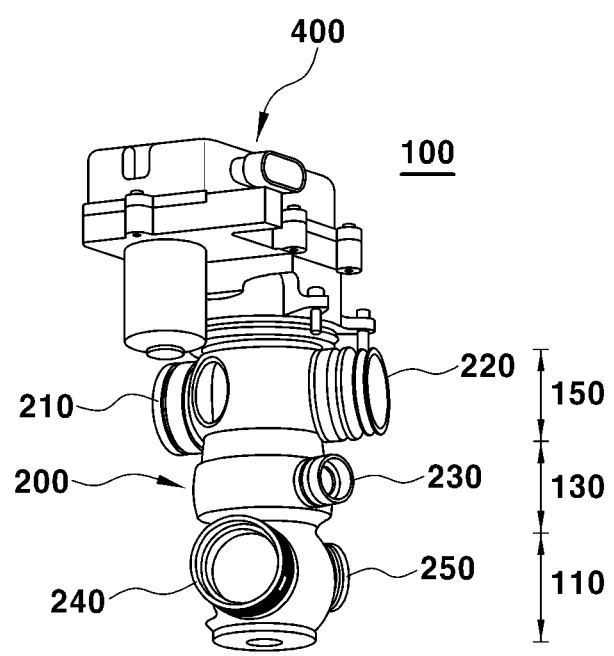
FIG. 3 is a diagram illustrating an integrated cooling control valve according to an embodiment of the present disclosure.
Figure 4:
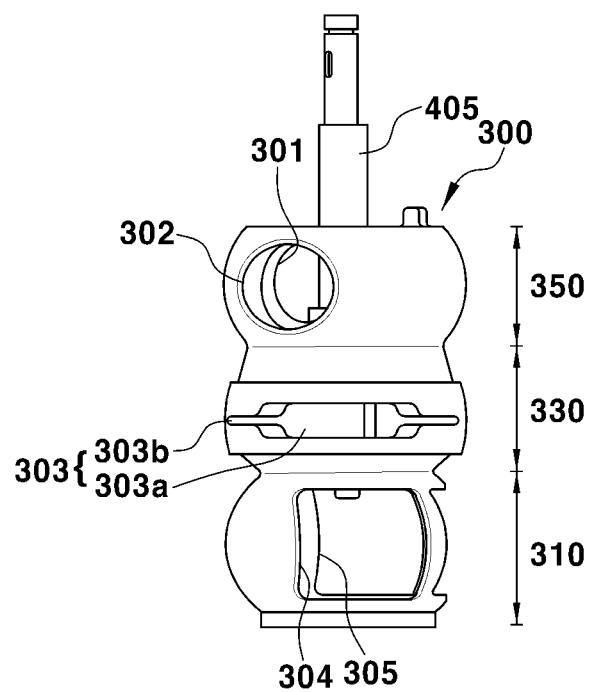
FIG. 4 is a diagram illustrating a valve plate according to an embodiment of the present disclosure.

FIG. 3 is a diagram illustrating the integrated cooling control valve according to an embodiment of the present disclosure. FIG. 4 is a diagram illustrating a valve plate according to an embodiment of the present disclosure.

Referring to FIGS. 2 to 4, the integrated cooling control valve 100 may include a ball valve 200 (i.e., a valve housing 200), a ball valve 300 (i.e., a valve plate 300), and an actuator 400. The ball valves 200 and 300 may have at least three layers. A layer farthest from the location where the actuator 400 is disposed may mean a first layer 110, 310 of the ball valves 200 and 300. A layer closest to the actuator 400 may mean a third layer 150, 350 of the ball valves 200 and 300. A second layer 130, 330 of the ball valves 200 and 300 may be disposed between the first layer 110, 310 and the third layer 150, 350. The first layer 110, 310, the second layer 130, 330 and the third layer 150, 350 of the ball valves 200 and 300 may be interconnected.

The ball valves 200 and 300 may include a valve housing 200 and a valve plate 300. The valve housing 200 may be an element surrounding the valve plate 300. The opening and closing of the ball valves 200 and 300 may be determined by the rotation of the valve plate 300 disposed within the valve housing 200. The valve plate 300 may be coupled to the actuator 400 by a rotating shaft 405. The rotating shaft 405 may provide the valve plate 300 with a driving power generated by the actuator 400. The valve plate 300 may be integrated and rotated with the actuator 400 by the driving of the actuator 400. The valve plate 300 as a whole is rotated by the actuator 400.

The valve housing 200 may include a first port 210 coupled to the fuel cell stack 10, a second port 220 coupled to the COD heater 20, a third port 230 coupled to the ion filter 50, a fourth port 240 coupled to the radiator 30, and a fifth port 250 coupled to the coolant supply pump 40. Specifically, the first port 210 may be a port through which a coolant is introduced from the fuel cell stack 10 to the integrated cooling control valve 100. The second port 220 may be a port through which the coolant is introduced from the COD heater 20 to the integrated cooling control valve 100. The third port 230 may be a port through which the coolant is introduced from the ion filter 50 to the integrated cooling control valve 100. The fourth port 240 may be a port through which the coolant is introduced from the radiator 30 to the integrated cooling control valve 100. The fifth port 250 may be a port through which the coolant is supplied from the integrated cooling control valve 100 to the coolant supply pump 40. The fourth port 240 and the fifth port 250 may be coupled to the same layer of the ball valves 200 and 300. The first port 210 may be coupled to any one of the second port 220 or the third port 230 and the same layer of the ball valves 200, 300. In this case, the other port that belongs to the second port 220 or the third port 230 and that is not coupled to the first port 210 may be solely coupled to any one layer of the ball valves 200 and 300. Preferably, the third port 230 may be solely coupled to any one layer of the ball valves 200 and 300.

For example, the fourth port 240 and the fifth port 250 may be coupled to the first layer 110, 310 of the ball valves 200 and 300. The third port 230 may be coupled to the second layer 130, 330 of the ball valves 200 and 300. The first port 210 and the second port 220 may be coupled to the third layer 150, 350 of the ball valves 200 and 300.

For another example, the fourth port 240 and the fifth port 250 may be coupled to the first layer 110 of the ball valves 200 and 300. The second port 220 may be coupled to the second layer 130, 330 of the ball valves 200 and 300. The first port 210 and the third port 230 may be coupled to the third layer 150, 350 of the ball valves 200 and 300.

For another example, the fourth port 240 and the fifth port 250 may be coupled to the first layer 110, 310 of the ball valves 200 and 300. The first port 210 may be coupled to the second layer 130, 330 of the ball valves 200 and 300. The second port 220 and the third port 230 may be coupled to the third layer 150, 350 of the ball valves 200 and 300.

For another example, the fourth port 240 and the fifth port 250 may be coupled to the first layer 110, 310 of the ball valves 200 and 300. The first port 210 and the third port 230 may be coupled to the second layer 130, 330 of the ball valves 200 and 300. The second port 220 may be coupled to the third layer 150, 350 of the ball valves 200 and 300.

For another example, the fourth port 240 and the fifth port 250 may be coupled to the second layer 130, 330 of the ball valves 200 and 300. The first port 210 and the third port 230 may be coupled to the first layer 110, 310 of the ball valves 200 and 300. The second port 220 may be coupled to the third layer 150, 350 of the ball valves 200 and 300.

For another example, the fourth port 240 and the fifth port 250 may be coupled to the third layer 150, 350 of the ball valves 200 and 300. The second port 220 may be coupled to the second layer 130, 330 of the ball valves 200 and 300. The first port 210 and the third port 230 may be coupled to the first layer 110, 310 of the ball valves 200 and 300.

The valve plate 300 is disposed within the valve housing 200, and may have at least three layers in order to open and close the first port 210, the second port 220, the third port 230, the fourth port 240, and the fifth port 250. A layer farthest from the location where the actuator 400 is disposed may mean the first layer 310 of the valve plate 300. A layer closest to the actuator 400 may mean the third layer 350 of the valve plate 300. The second layer 330 of the valve plate 300 may be disposed between the first layer 310 and the third layer 350. The first layer 310, the second layer 330 and the third layer 350 of the valve plate 300 may be interconnected.

A first hole 301, a second hole 302, a third hole 303, a fourth hole 304, and a fifth hole 305 through which the coolant flows through communicating with the first port 210, the second port 220, the third port 230, the fourth port 240, and the fifth port 250 may be defined in the valve plate 300. The first hole 301 and the second hole 302 may communicate with the first port 210 and the second port 220. For example, by the rotation of the valve plate 300, the first hole 301 and the first port 210 may communicate with each other, and the first hole 301 and the second port 220 may communicate with each other. Furthermore, by the rotation of the valve plate 300, the second hole 302 and the first port 210 may communicate with each other, and the second hole 302 and the second port 220 may communicate with each other. The third hole 303 may communicate with the third port 230. The fourth hole 304 and the fifth hole 305 may communicate with the fourth port 240 and the fifth port 250, respectively. For example, by the rotation of the valve plate 300, the fourth hole 304 may communicate with the fourth port 240, and the fourth hole 304 may communicate with the fifth port 250. By the rotation of the valve plate 300, the fifth hole 305 may communicate with the fourth port 240, and the fifth hole 305 and the fifth port 250 may communicate with each other.

The fourth hole 304 and the fifth hole 305 may be defined in the first layer 310 of the valve plate 300. The third hole 303 may be defined in the second layer 330 of the valve plate 300. The first hole 301 and the second hole 302 may be defined in the third layer 350 of the valve plate 300. In this case, locations of the holes 301, 302, 303, 304, and 305 defined in the layers of the valve plate 300 may be different depending on to which layers of the ball valves 200 and 300 the first to fifth ports 210, 220, 230, 240, and 250 are coupled.

Each of the first to fifth holes 301, 302, 303, 304, and 305 may mean a space opened for the coolant to flow therethrough. For example, each of the first to fifth holes 301, 302, 303, 304, and 305 may mean a space opened in a shape, such as a circle or a rectangle. In particular, the opened space of the third hole 303 may be divided into a central part 303*a* and a slit part 303b provided on both sides of the central part 303a. The slit part 303b may have a smaller opened area than the central part 303a. If the slit part 303b having a relatively small open area overlaps the third port 230, a flux of the coolant introduced into the integrated cooling control valve 100 may be smaller than 100%. That is, a flux of the coolant introduced into integrated cooling control valve 100 through the third port 230 may be controlled by adjusting the opened area of the slit part 303b.

A long downhill section may mean a section in which a vehicle on which a fuel cell is mounted performs regenerative braking. Specifically, the long downhill section may mean a section in which the braking of a vehicle is performed or a regenerative braking section. In the long downhill section, a battery needs to be charged with power generated by the fuel cell stack or the battery needs to consume power generated by the fuel cell stack using the COD heater in the state in which the battery has been fully charged. Accordingly, in order to increase a flux of the coolant from the COD heater to the integrated cooling control valve, a port (e.g., the second port 220 of FIG. 3) of the integrated cooling control valve coupled to the COD heater may be opened.

In a cold start section, when the fuel cell stack starts up in the state in which a temperature of the coolant is equal to or less than a predetermined cold start temperature, the COD heater may operate using power generated by the fuel cell stack. As the temperature of the coolant rises, in order to run the coolant into the fuel cell stack, a port (e.g., the second port 220 of FIG. 3) of the integrated cooling control valve coupled to the COD heater may be gradually closed, and a port (e.g., the first port 210 of FIG. 3) of the integrated cooling control valve coupled to the fuel cell stack may be opened.

A temperature control section may mean a section in which the fuel cell stack operates in full swing after the cold start section lapses. To this end, the coolant supply pump may be driven. In order to cool the coolant having a temperature raised by the driving of the fuel cell stack, a port (e.g., the fourth port 240 of FIG. 3) of the integrated cooling control valve coupled to the radiator may be gradually opened.

A high output section may mean a section in which the fuel cell stack operates to the maximum. In the high output section, in order to cool the coolant having a temperature raised by the operation of the fuel cell stack again, the total quantity of the coolant discharged from the fuel cell stack may be run into the radiator. Accordingly, a port (e.g., the fourth port 240 of FIG. 3) of the integrated cooling control valve coupled to the radiator may be opened to the maximum. Furthermore, a port (e.g., the first port 210 of FIG. 3) of the integrated cooling control valve coupled to the fuel cell stack may be closed.

According to an embodiment of the present disclosure, in order to control a flux and direction of a coolant, the integrated cooling control valve 100 capable of controlling the five ports may be applied to the fuel cell TMS. In this case, in constructing the integrated cooling control valve 100, only one actuator 400 may be provided. Since the valve plate 300 constituting the ball valves 200 and 300 is integrated and rotated, only one actuator 400 is necessary, and all of the five ports 210, 220, 230, 240, and 250 may be controlled by the rotation of the valve plate 300 having the three layers. Expenses consumed to constitute valves can be reduced because the fuel cell TMS can be controlled through the one integrated cooling control valve 100. Furthermore, the number of actuators 400 provided to implement the fuel cell TMS can be reduced because the one actuator 400 is applied to the one integrated cooling control valve 100. Accordingly, costs for implementing the entire system can be reduced. Furthermore, a package may become compact because the number of actuators 400 having a relatively large volume is reduced.

Figure 5:
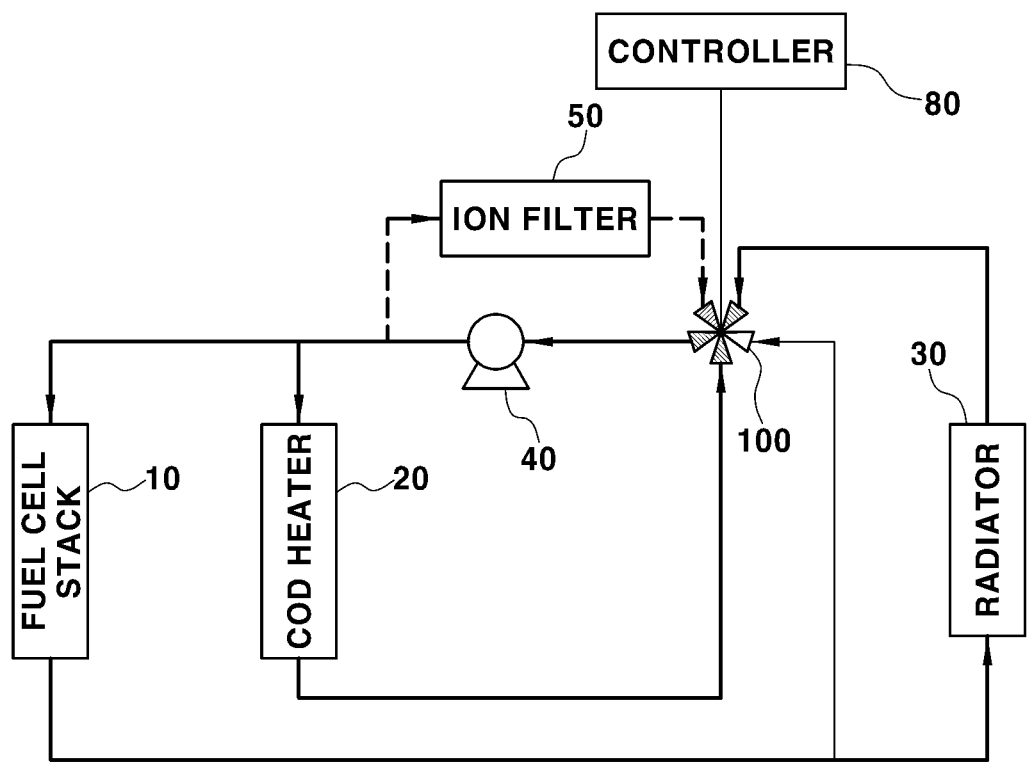
FIG. 5 is a diagram illustrating the fuel cell TMS in a long downhill section according to an embodiment of the present disclosure.
Figure 6:
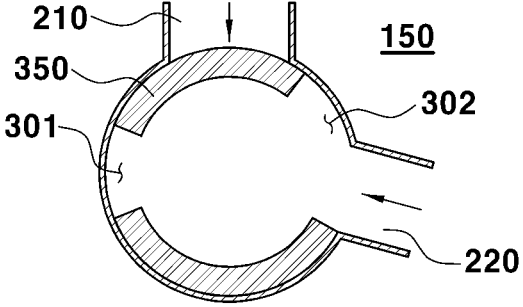
FIG. 6 is a diagram illustrating an operation mechanism of the integrated cooling control valve in the long downhill section according to an embodiment of the present disclosure.
Figure 6:
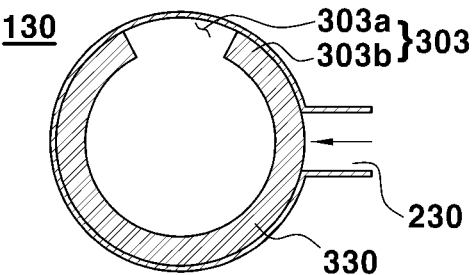
Figure 6:
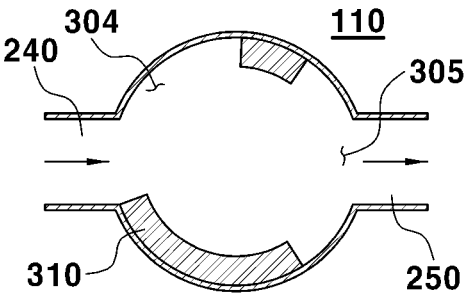

FIG. 5 is a diagram illustrating the fuel cell TMS in the long downhill section according to an embodiment of the present disclosure. FIG. 6 is a diagram illustrating an operation mechanism of the integrated cooling control valve in the long downhill section according to an embodiment of the present disclosure. FIGS. 5 and 6 are diagrams describing an operation mechanism based on the structure of the ball valves 200 and 300 illustrated in FIGS. 3 and 4.

Referring to FIGS. 5 and 6, a controller 80 for controlling the integrated cooling control valve 100 may be provided. The controller 80 may control the opening and closing of the ball valves 200 and 300 in the long downhill section, the cold start section, the temperature control section, and the high output section.

In the long downhill section, the controller 80 may open the second port 220 coupled to the COD heater 20, the fourth port 240 coupled to the radiator 30, and the fifth port 250 coupled to the coolant supply pump 40, and may close the first port 210 coupled to the fuel cell stack 10. The fourth hole 304 of the valve plate 300 may overlap the fourth port 240, and thus the coolant may flow therethrough. The fifth hole 305 of the valve plate 300 overlaps the fifth port 250, and thus the coolant may flow therethrough. Preferably, the fourth port 240 and the fifth port 250 may be fully opened. The second hole 302 of the valve plate 300 may overlap the second port 220, and thus the coolant may flow therethrough. Preferably, the second port 220 may be fully opened. The first hole 301 of the valve plate 300 does not overlap the first port 210, and the third layer 350 of the valve plate 300 may block the first port 210. Accordingly, the coolant may not flow from the fuel cell stack 10 to the integrated cooling control valve 100.

Only part of the third port 230 coupled to the ion filter 50 may be opened. The slit part 303b of a third hole 303 of the valve plate 300 may overlap the third port 230. Some of the coolant from which ions have been removed by the ion filter 50 may flow into the integrated cooling control valve 100. That is, the central part 303a of the third hole 303 may not overlap the third port 230.

Figure 7:
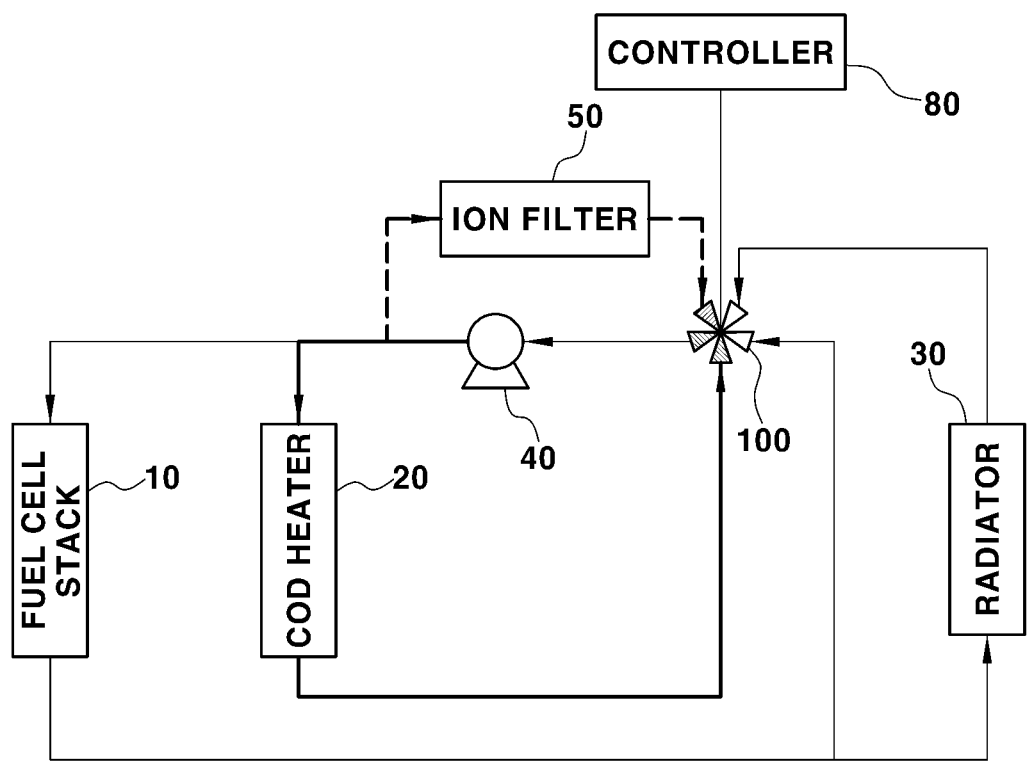
FIG. 7 is a diagram illustrating the fuel cell TMS in the cold start section according to an embodiment of the present disclosure.
Figure 8:
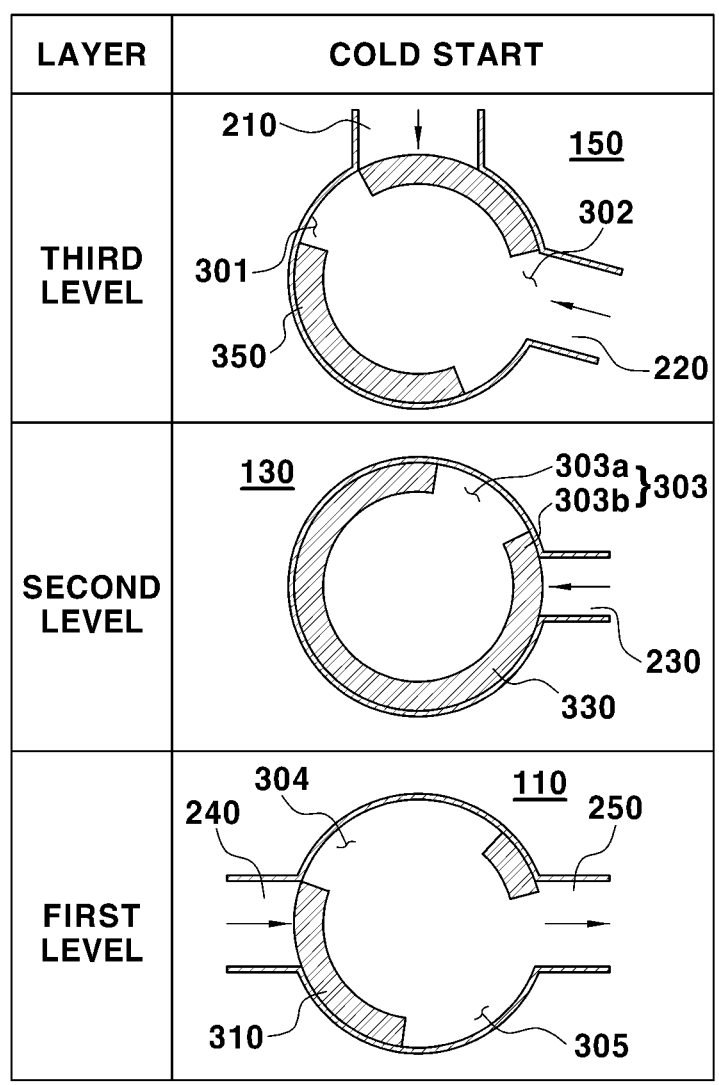
FIG. 8 is a diagram illustrating an operation mechanism of the integrated cooling control valve in the cold start section according to an embodiment of the present disclosure.

FIG. 7 is a diagram illustrating the fuel cell TMS in the cold start section according to an embodiment of the present disclosure. FIG. 8 is a diagram illustrating an operation mechanism of the integrated cooling control valve in the cold start section according to an embodiment of the present disclosure. FIGS. 7 and 8 are diagrams describing an operation mechanism based on the structure of the ball valves 200 and 300 illustrated in FIGS. 3 and 4.

Referring to FIGS. 7 and 8, the controller 80 for controlling the integrated cooling control valve 100 may be provided. The controller 80 may control the opening and closing of the ball valves 200 and 300 in the long downhill section, the cold start section, the temperature control section, and the high output section.

In the cold start section, the controller 80 may open the second port 220 coupled to the COD heater 20 and the fifth port 250 coupled to the coolant supply pump 40, and may close the first port 210 coupled to the fuel cell stack 10 and the fourth port 240 coupled to the radiator 30. Accordingly, the COD heater 20 may raise a temperature of the coolant up to a temperature of the coolant for the driving of the fuel cell stack 10. The first layer 310 of the valve plate 300 may overlap the fourth port 240 and close the fourth port 240. The fifth hole 305 of the valve plate 300 may overlap the fifth port 250, so that the coolant may flow therethrough. Accordingly, the coolant may flow from the integrated cooling control valve 100 to the coolant supply pump 40. The second hole 302 of the valve plate 300 may overlap the second port 220, so that the coolant may flow therethrough. Preferably, the second port 220 may be fully opened. The first hole 301 of the valve plate 300 may not overlap the first port 210, and the valve plate 300 may close the first port 210. Accordingly, the coolant may not flow from the fuel cell stack 10 to the integrated cooling control valve 100.

Only part of the third port 230 coupled to the ion filter 50 may be opened. The slit part 303b of a third hole 303 of the valve plate 300 may overlap the third port 230. Some of the coolant from which ions have been removed by the ion filter 50 may flow into the integrated cooling control valve 100. That is, the central part 303a of the third hole 303 may not overlap the third port 230.

Figure 9:
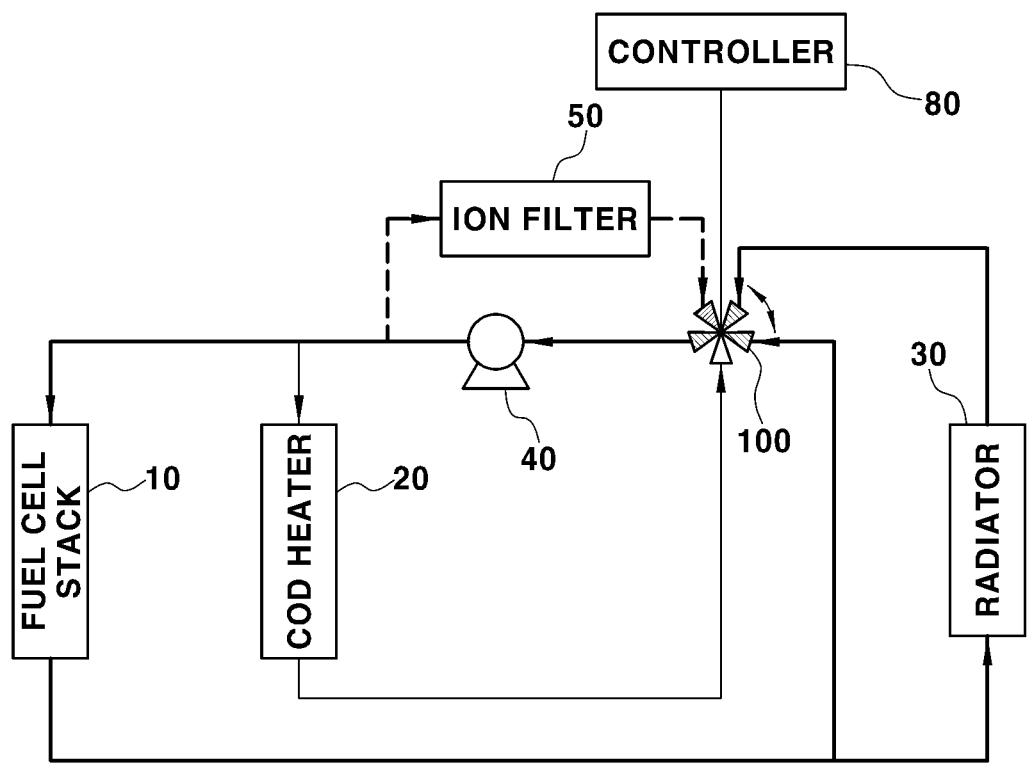
FIG. 9 is a diagram illustrating the fuel cell TMS in a temperature control section according to an embodiment of the present disclosure.
Figure 10:
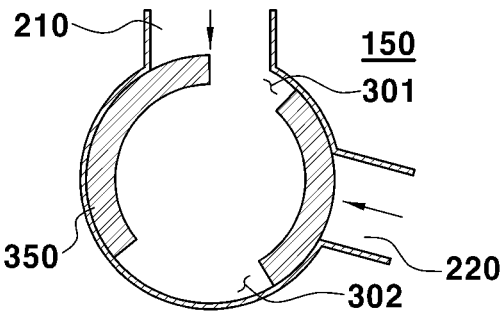
FIG. 10 is a diagram illustrating an operation mechanism of the integrated cooling control valve in the temperature control section according to an embodiment of the present disclosure.
Figure 10:
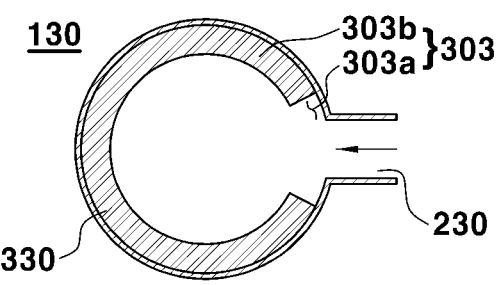
Figure 10:
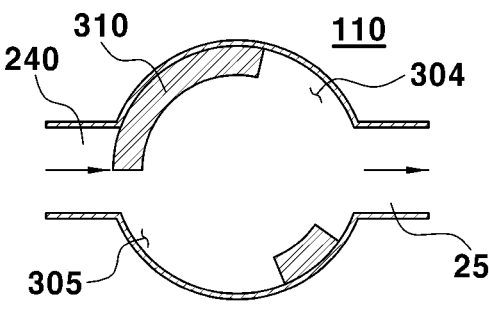

FIG. 9 is a diagram illustrating the fuel cell TMS in the temperature control section according to an embodiment of the present disclosure. FIG. 10 is a diagram illustrating an operation mechanism of the integrated cooling control valve in the temperature control section according to an embodiment of the present disclosure. FIGS. 9 and 10 are diagrams describing an operation mechanism based on the structure of the ball valves 200 and 300 illustrated in FIGS. 3 and 4.

Referring to FIGS. 9 and 10, the controller 80 for controlling the integrated cooling control valve 100 may be provided. The controller 80 may control the opening and closing of the ball valves 200 and 300 in the long downhill section, the cold start section, the temperature control section, and the high output section.

In the temperature control section, the controller 80 may partially open the first port 210 coupled to the fuel cell stack 10 and the fourth port 240 coupled to the radiator 30, may fully open the third port 230 coupled to the ion filter 50 and the fifth port 250 coupled to the coolant supply pump 40, and may close the second port 220 coupled to the COD heater 20. In the temperature control section, the controller 80 may control a temperature of the coolant based on a degree to which the first port 210 and the fourth port 240 are opened. The first layer 310 of the valve plate 300 may partially close the fourth port 240. The fifth hole 305 of the valve plate 300 may partially overlap the fourth port 240, so that the coolant may flow therethrough. The fourth hole 304 of the valve plate 300 may overlap the fifth port 250, so that the coolant may flow therethrough. Preferably, the fifth port 250 may be fully opened. The third hole 303 of the valve plate 300 may overlap the third port 230, so that the coolant may flow therethrough. Preferably, the third port 230 may be fully opened. The third layer 350 of the valve plate 300 may partially close the first port 210 and may fully close the second port 220. The first hole 301 of the valve plate 300 may partially overlap the first port 210, so that the coolant may flow therethrough. As a result, a degree of opening of the first port 210 and the fourth port 240 may be controlled by the rotation of the valve plate 300, so that a temperature of the coolant can be controlled.

Figure 11:
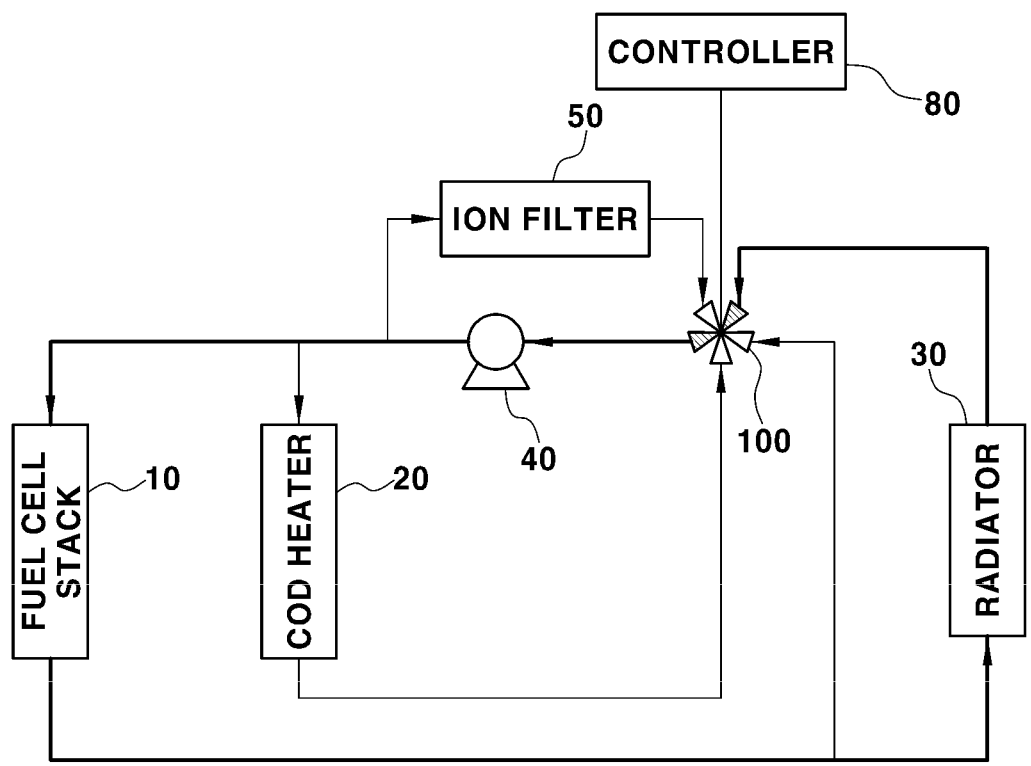
FIG. 11 is a diagram illustrating the fuel cell TMS in a high output section according to an embodiment of the present disclosure.
Figure 12:
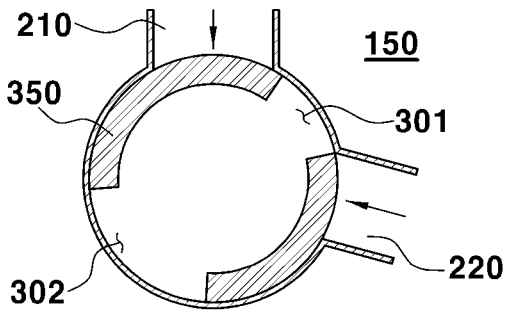
FIG. 12 is a diagram illustrating an operation mechanism of the integrated cooling control valve in the high output section according to an embodiment of the present disclosure.
Figure 12:
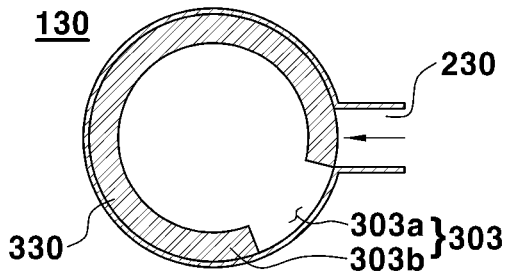
Figure 12:
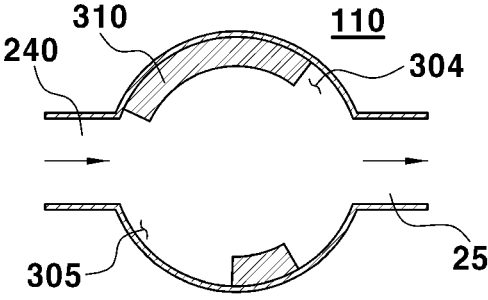

FIG. 11 is a diagram illustrating the fuel cell TMS in the high output section according to an embodiment of the present disclosure. FIG. 12 is a diagram illustrating an operation mechanism of the integrated cooling control valve in the high output section according to an embodiment of the present disclosure. FIGS. 11 and 12 are diagrams describing an operation mechanism based on the structure of the ball valves 200 and 300 illustrated in FIGS. 3 and 4.

Referring to FIGS. 11 and 12, the controller 80 for controlling the integrated cooling control valve 100 may be provided. The controller 80 may control the opening and closing of the ball valves 200 and 300 in the long downhill section, the cold start section, the temperature control section, and the high output section.

In the temperature control section, the controller 80 may close the first port 210 coupled to the fuel cell stack 10 and the second port 220 coupled to the COD heater 20, and may fully open the fourth port 240 coupled to the radiator 30 and the fifth port 250 coupled to the coolant supply pump 40. The fifth hole 305 of the valve plate 300 may overlap the fourth port 240, so that the coolant may flow therethrough. The fourth hole 304 of the valve plate 300 may overlap the fifth port 250, so that the coolant may flow therethrough. The third layer 350 of the valve plate 300 may close the first port 210 and the second port 220. That is, the first hole 310 and the second hole 302 of the valve plate 300 may not overlap the first port 210 and the second port 220.

Only part of the third port 230 coupled to the ion filter 50 may be opened. The slit part 303b of the third hole 303 of the valve plate 300 may overlap the third port 230. Some of the coolant from which ions have been removed by the ion filter 50 may flow into the integrated cooling control valve 100. That is, the central part 303a of the third hole 303 may not overlap the third port 230.

According to an embodiment of the present disclosure, in order to control a flux and direction of a coolant, the integrated cooling control valve capable of controlling the five ports may be applied to a fuel cell TMS. Since the valve plate constituting the ball valve is integrated and rotated, only one actuator is necessary, and all of the five ports may be controlled by the rotation of the valve plate having the three layers. Expenses consumed to constitute valves can be reduced because the fuel cell TMS can be controlled using the one integrated cooling control valve.

According to an embodiment of the present disclosure, since one actuator is applied to the one integrated cooling control valve, the number of actuators provided to implement a fuel cell TMS can be reduced, and costs for implementing the entire system can be reduced. Furthermore, a package can become compact because the number of actuators having a relatively large volume is reduced.

While the exemplary embodiments of the present disclosure have been described above in detail, the terms and words used in the present specification and claims should not be construed as being limited to the ordinary or dictionary meanings, and in addition, the configurations illustrated in the exemplary embodiments and drawings described in the present specification are only preferred exemplary embodiments of the present disclosure, so that the scope of the present disclosure is not limited to the aforementioned exemplary embodiments, and various modifications and improvements by those skilled in the art using the basic concept of the present disclosure defined in the appended claims are also included in the scope of the present disclosure.

What is claimed is:

1. An integrated cooling control valve applied to a fuel cell thermal management system (TMS), the integrated cooling control valve comprising:
   a ball valve having at least three layers, wherein the ball valve comprises:
      a valve housing comprising a first port fluidly connected to a fuel cell stack, a second port coupled to a cathode oxygen depletion (COD) heater, a third port coupled to an ion filter, a fourth port coupled to a radiator, and a fifth port coupled to a coolant supply pump; and a valve plate disposed within the valve housing and including at least three layers to open and close the first port, the second port, the third port, the fourth port, and the fifth port.

2. The integrated cooling control valve of claim 1, further comprising:

an actuator configured to provide a driving power for rotating the valve plate; and a rotating shaft configured to provide the valve plate with the driving power generated by the actuator, wherein the valve plate as a whole is configured to be rotated by the actuator.

3. The integrated cooling control valve of claim 1, wherein a first hole, a second hole, a third hole, a fourth hole, and a fifth hole through which a coolant flows in communication with the first port, the second port, the third port, the fourth port, and the fifth port are defined in the valve plate.

4. The integrated cooling control valve of claim 3, wherein:

the third hole provided at a level of the ball valve corresponding to the third port comprises a central part and a slit part provided on both sides of the central part; and the slit part has a smaller opened area than the central part.

5. The integrated cooling control valve of claim 1, wherein the fourth port and the fifth port are coupled to the same layer of the ball valve.

6. The integrated cooling control valve of claim 1, wherein the first port is in communication with any one of the second port or the third port and coupled to the same layer of the ball valve as the one of the second port or the third port.

7. The integrated cooling control valve of claim 6, wherein the second port or the third port not in communication with the first port is solely coupled to any one layer of the ball valve.

8. The integrated cooling control valve of claim 1, wherein:

the first port is a port through which a coolant is introduced from the fuel cell stack;

the second port is a port through which the coolant is introduced from the COD heater;

the third port is a port through which the coolant is introduced from the ion filter;

the fourth port is a port through which the coolant is introduced from the radiator; and the fifth port is a port through which the coolant is supplied toward the coolant supply pump.

9. An integrated cooling control valve applied to a fuel cell thermal management system (TMS), the integrated cooling control valve comprising:

a ball valve having at least three layers, wherein the ball valve comprises:

a valve housing comprising a first port fluidly connected to a fuel cell stack, a second port coupled to a cathode oxygen depletion (COD) heater, a third port coupled to an ion filter, a fourth port coupled to a radiator, and a fifth port coupled to a coolant supply pump; and a valve plate disposed within the valve housing and including at least three layers to open and close the first port, the second port, the third port, the fourth port, and the fifth port; and a controller configured to control an actuator for driving the ball valve, wherein the controller is configured to control opening and closing of the ball valve in a long downhill section, a cold start section, a temperature control section, and a high output section.

10. The integrated cooling control valve of claim 9, wherein in the long downhill section, the controller is configured to control the valve plate to close the first port and the third port so that a coolant introduced from the radiator and the COD heater is supplied to the coolant supply pump.

11. The integrated cooling control valve of claim 9, wherein in the cold start section, the controller is configured to control the valve plate to close the first port, the third port, and the fourth port so that a coolant introduced from the COD heater is supplied to the coolant supply pump.

12. The integrated cooling control valve of claim 9, wherein in the temperature control section, the controller is configured to control the valve plate to close the second port so that a coolant introduced from the fuel cell stack and the radiator is supplied to the coolant supply pump.

13. The integrated cooling control valve of claim 9, wherein:

in the high output section, the controller is configured to control the valve plate to close the first port, the second port, and the third port so that a coolant introduced from the radiator is supplied to the coolant supply pump; and a total amount of the coolant discharged from the fuel cell stack is configured to flow into the radiator and be cooled.

14. An integrated cooling control valve applied to a fuel cell thermal management system (TMS), the integrated cooling control valve comprising:

a ball valve comprising:

a first layer, a second layer, and a third layer, wherein the first layer of the ball valve is a layer farthest from a location where an actuator for driving the ball valve is disposed, and the third layer of the ball valve is a layer closest to the actuator;

a valve housing comprising a first port fluidly connected to a fuel cell stack, a second port coupled to a cathode oxygen depletion (COD) heater, a third port coupled to an ion filter, a fourth port coupled to a radiator, and a fifth port coupled to a coolant supply pump; and a valve plate disposed within the valve housing and including at least three layers to open and close the first port, the second port, the third port, the fourth port, and the fifth port.

15. The integrated cooling control valve of claim 14, wherein:

the first layer is provided with the fourth port and the fifth port;

the second layer is provided with the third port; and the third layer is provided with the first port and the second port.

16. The integrated cooling control valve of claim 14, wherein:

the first layer is provided with the fourth port and the fifth port;

the second layer is provided with the second port; and the third layer is provided with the first port and the third port.

17. The integrated cooling control valve of claim 14, wherein:

the first layer is provided with the fourth port and the fifth port;

the second layer is provided with the first port; and the third layer is provided with the second port and the third port.

18. The integrated cooling control valve of claim 14, wherein:

the first layer is provided with the fourth port and the fifth port;

the second layer is provided with the first port and the third port; and the third layer is provided with the second port.

19. The integrated cooling control valve of claim 14, wherein:

the first layer is provided with the first port and the third port;

the second layer is provided with the fourth port and the fifth port; and the third layer is provided with the second port.

20. The integrated cooling control valve of claim 14, wherein:

the first layer is provided with the first port and the third port;

the second layer is provided with the second port; and the third layer is provided with the fourth port and the fifth port.

* * * * *